US010264723B2

(12) United States Patent
Gresch et al.

(10) Patent No.: US 10,264,723 B2
(45) Date of Patent: Apr. 23, 2019

(54) METHOD FOR CALCULATING OPTIMIZED FILLING AMOUNTS FOR A MACHINE FOR APPLICATION OF AGRICULTURAL MATERIAL AND FOR CREATION OF AN OPTIMIZED PATH

(71) Applicant: Deere & Company, Moline, IL (US)

(72) Inventors: Valentin Gresch, Kaiserslautern (DE); Martin Kremmer, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/721,607

(22) Filed: Sep. 29, 2017

(65) Prior Publication Data
US 2018/0084711 A1    Mar. 29, 2018

(30) Foreign Application Priority Data
Sep. 29, 2016 (DE) .................. 10 2016 218 860

(51) Int. Cl.
*A01C 7/00* (2006.01)
*A01C 7/10* (2006.01)
*A01C 15/00* (2006.01)
*A01B 79/00* (2006.01)
*A01C 21/00* (2006.01)

(52) U.S. Cl.
CPC ............ *A01C 7/102* (2013.01); *A01C 15/003* (2013.01); *A01B 79/005* (2013.01); *A01C 15/006* (2013.01); *A01C 21/005* (2013.01)

(58) Field of Classification Search
CPC ....... A01B 79/005; A01C 7/08; A01C 21/005; A01C 7/081; A01C 7/102; A01C 7/105; A01C 15/003; A01C 15/006

USPC ............ 111/177, 200, 180, 185, 73, 80, 54; 221/8, 211; 239/61–65; 701/50
See application file for complete search history.

(56) References Cited

U.S. PATENT DOCUMENTS

| | | | | |
|---|---|---|---|---|
| 5,301,848 A | * | 4/1994 | Conrad .................. | A01C 7/105 111/903 |
| 5,924,371 A | * | 7/1999 | Flamme ............... | A01B 79/005 111/177 |
| 6,070,539 A | | 6/2000 | Flamme et al. | |

(Continued)

FOREIGN PATENT DOCUMENTS

| | | |
|---|---|---|
| DE | 4223585 A1 | 1/1994 |
| DE | 19532870 A1 | 3/1997 |

(Continued)

OTHER PUBLICATIONS

European Search Report issued in counterpart application No. 17191324.7 dated Jan. 25, 2018. (14 pages).

*Primary Examiner* — Robert E Pezzuto

(57) ABSTRACT

A method is proposed for calculation of optimized filling amounts for containers of a machine for application of an agricultural material, in which a path plan is created and a constant or site-specific variable amount of the agricultural material to be applied along the paths for each container provided in the path plan for the individual containers is added up for calculation and output of the amounts to be filled in each case. In addition, an optimized path plan can be calculated for the machine in terms of a balancing of the amounts of agricultural material to be removed from the individual containers.

10 Claims, 2 Drawing Sheets

(56) References Cited

U.S. PATENT DOCUMENTS

| | | | |
|---|---|---|---|
| 6,494,154 B2 * | 12/2002 | Kinzenbaw | A01C 7/04 |
| | | | 111/54 |
| 9,596,803 B2 * | 3/2017 | Wendte | A01C 21/005 |
| 2015/0059630 A1 | 3/2015 | Kinzenbaw et al. | |
| 2016/0095274 A1 | 4/2016 | Wendte et al. | |

FOREIGN PATENT DOCUMENTS

| | | |
|---|---|---|
| DE | 19629618 A1 | 1/1998 |
| DE | 102011050885 A1 | 12/2012 |
| DE | 102014223843 A1 | 5/2016 |
| EP | 1522823 A1 | 4/2005 |
| EP | 2517545 A1 | 10/2012 |
| EP | 2931018 A1 | 10/2015 |

* cited by examiner

METHOD FOR CALCULATING OPTIMIZED FILLING AMOUNTS FOR A MACHINE FOR APPLICATION OF AGRICULTURAL MATERIAL AND FOR CREATION OF AN OPTIMIZED PATH

RELATED APPLICATIONS

This document claims priority based on German Patent Application No. 102016218860.7, filed on Sep. 29, 2016, which is hereby incorporated by reference into this application.

FIELD OF INVENTION

This disclosure concerns a method for calculation of optimized filling amounts for containers of a machine for application of agricultural material including the creation of an optimized path for such a machine.

BACKGROUND

Seeding machines serve to sow seeds on a field. They comprise a seed container, a furrow opener, means for successive introduction of seeds into the furrow made by the furrow opener, and a closing wheel to close the furrow. The seed container should, as far as possible, be filled with exactly as much seed as is necessary for sowing a work assignment, for example, for one or more fields. If too much seed is put into the seed container, it must be removed, at least if different seed is to be sown later. More critical is the case when too little seed is present, since then in the worst case a part of the field will be left unseeded or at the least the seeding operation, when the lack of seed was detected by means of a sensor (see U.S. Pat. No. 6,070,539), will have to be interrupted and cannot be continued until the seed container has been refilled.

In the prior art it was proposed that the required filling amount for a seed container of a seeding machine be calculated by means of the area of the field and the number of seeds per unit of area, for which a program on a portable computer can be used (e.g., Seed Calc by Minskaysoft). The required weight of seed is calculated by means of the thousand kernel weight. This calculation assumes a constant number of seeds per unit area.

Furthermore, it was proposed (German Patent Application No. DE 195 32 870 A1) to create a path plan for a seeding machine over a field and, taking into account a site-specific advance planning of the seed rate, to calculate a point at which the supply container can be reasonably filled on the field in order to avoid empty and duplicated runs on the field. A similar planning of a path for a seeding machine and its refilling points, but without taking into account site-specific planned seed rates, is described in German Patent Application No. DE 196 29 618 A1. German Patent Application No. DE 10 2011 050 885 A1 proposes to calculate, by means of the entered or sensor-registered fill state of a single container of the machine, the available path that can still be covered with the machine using a known path planning, and if necessary to optimize the application rate and possibly the refill point in terms of saving time.

In the prior art that was mentioned, the seeding machine is provided with a single container from which the seed is withdrawn. Accordingly, calculation of the necessary filling amount is relatively easy in that one multiplies the area of the field by a constant (in the case of the said program) or variable (in the case of German Patent Application No. DE 195 32 870 A1) number of seed kernels per unit area.

However, there are also seeding machines in use, in particular single grain seeding machines that are outfitted with a plurality of seeding units disposed side by side, each of which has a separate seed container associated with it (see German Patent Application No. DE 10 2014 223 843 A1). In the case of such seeding machines, there are conceivable applications in which a certain seed container covers a considerably longer path while having the same seed spacings (for example when traveling on curves) and/or deposits considerably more seeds per covered stretch (for example when partial widths of the seeding machine are shut down because of the shape of the field or because seed rates vary over the width of the machine) than another seed container and for this reason must deposit more seed than the other seed containers. However, the previous methods for calculating the necessary filling amount cannot take these factors into account, which leads either to prematurely empty containers or seed remaining in the containers after the job. A similar problem arises when a machine deposits other agricultural materials such as fertilizers or pesticides onto a field from a plurality of containers distributed over its width.

Therefore, there is a need for a method for calculating filling amounts for side-by-side disposed containers of a machine for application of agricultural material that takes into account paths and/or application rates that differ over the width of the machine.

Furthermore, in the method known from German Patent Application No. DE 196 29 618 A1 for planning a path of a machine for application of material over a field, the said problem, that—in the case of ill-considered path planning—the container can empty at different rates, which limits the path run between refilling operations, is not taken into account This invention is based on the task of solving, at least partially, one or more of the said problems.

SUMMARY

A method is proposed for calculating optimized filling amounts for side-by-side disposed containers of a machine for application of agricultural material, each container being provided with an application unit for the material. The method includes providing a data processor and creating, with the data processor, an intended path plan for each container of the machine for application of the agricultural material on an agricultural area. The method further includes calculating, with the data processor, the amount of material to be applied by each application unit per unit area, determining the amount of material to be applied along the intended path for each container provided in the intended path plan for the individual containers, and generating the total filling amount for each container to be filled as needed to carry out the intended path plan.

In another embodiment, a method is proposed for creation of an optimized path plan for a machine for application of agricultural material, which comprises side-by-side disposed containers provided with an application unit for the material. The method includes providing a data processor, receiving, with the data processor, data concerning an agricultural area on which the material is to be applied, calculating, with the data processor, the variable amount of material to be applied per unit area to the agricultural area, and generating an optimized path plan for the machine for application of the agricultural material to the agricultural area in terms of a balancing of the amounts of material to be removed from each of the containers.

In yet another embodiment, a control system for creation of an optimized path plan for a machine for application of agricultural material to an agricultural area is provided. The system comprises a plurality of side by side containers, each container associated with an application unit for applying the material, a fill level sensor associated with each container, the fill level sensor generating a signal indicative of a fill level of the container, and an application unit rate sensor associated with each application unit, the rate sensor generating a signal indicative of the rate at which material is being applied by the application unit. The system further comprises a control unit receiving the signals from the fill level sensor and the rate sensor and determining a path plan for the machine, wherein the control unit compares the fill levels and application rates for the plurality of containers to the path plan and recalculates the path plan to provide an optimum path plan.

BRIEF DESCRIPTION OF THE DRAWINGS

The drawings show an embodiment of the example, which is described below in more detail. Here.

DETAILED DESCRIPTION

Figure 2:
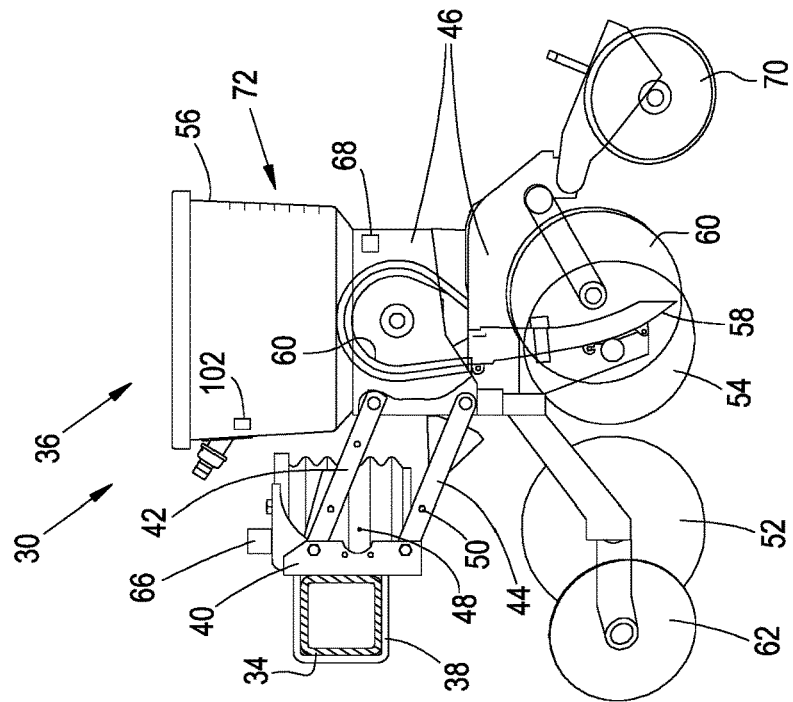
FIG. 2 shows a side view of a row unit of the machine.

Generally speaking, a path plan along which the machine can be moved and in doing so can apply the agricultural material (seed, fertilizers, chemicals, etc.) to the agricultural area is created with the help of the data processing system, which can be an on-board computer on the machine or a vehicle pulling it, or a separate portable or stationary computer, for example a smartphone, smartwatch, or smart glasses, or a tablet or a laptop computer, or a (farm) desktop computer. In doing so, conventional techniques for path planning can be employed, in which regard reference is made, for example, to German Patent Application No. DE 196 29 618 A1, European Patent Application No. EP 1 522 823 A1, and Oksanen, Timo, "PATH PLANNING ALGORITHMS FOR AGRICULTURAL FIELD MACHINES" Dissertation, Helsinki University of Technology (December 2007). In a simple embodiment, the field is initially traversed, while the points are registered and displayed by a satellite-supported position-determining system, and then a first path over the field (in particular at its edge) is established by driving or by operator entry, and the subsequent paths are defined as running parallel to the first path. In addition, how much material is to be applied per unit of length or area is entered into the data processing system by an operator or calculated by the system by means of data characterizing the agricultural area. This amount can be constant over the area or (for example, as noted in German Patent Application No. DE 195 32 870 A1) vary in a site-specific way, for example in dependence on the soil type or soil moisture or other site-specific data such as topography, etc. The path plan provides different paths for the individual containers, which are laterally offset from each other. The paths can be of different lengths, since a container on the outside part of a curve covers a longer path than a container on the inside of a curve, and the relevant amounts of material can differ, on the one hand in the case of application amounts that differ site-specifically over the width of the machine and on the other hand when partial widths of machine are switched off, for example in the case of a non-orthogonal run into a headland or in the case of triangle regions of a field. Thus, it is absolutely possible that the containers will need to deposit different amounts of material. This situation is taken into account according to this invention by adding up the amount of material in the path plan for each container to be applied along the paths provided for the individual containers. Thus, exact filling amounts in each case are determined and output. The containers can thus be filled with the appropriate filling amount and the application operation can be carried out.

In this way one gives an operator or an automatic device for filling the container the possibility of filling the container with only as much material as will be needed. Neither premature depletion of the supply in the container nor material still present in the container after the end of the application operation is to be expected. If the machine has a plurality of containers with material and means for optional feed of material from one of the containers to an application unit in order to be able to apply, for example, different seed to different places on the field (see U.S. Pat. No. 6,070,539 A1 or United States Patent Application No. 20150059630), this computation is preferably carried out separately for each container.

Preferably, a measurement of the actual filling amount in the container by a sensor, a comparison of the filling amount to be filled, and an output of a signal value dependent on the results of the comparison are provided in order to facilitate filling for an operator. The sensor can be a sensor to determine the fill state of the container, which is designed as a weight sensor or a level sensor, or a separate sensor, for example a (stereo) camera of a mobile telephone (smartphone), on which the calculation of the required amount of material can also be made.

Accordingly, data concerning the agricultural area to be provided with material, for example concerning the boundaries of said area and possibly any partial areas not to be provided with material, are entered into the data processing system. How much material is to be applied per unit area or length is entered or calculated analogously to the procedure discussed above. This amount can be constant for the area or can vary in a site-specific way. The data processing system thus has information about the boundaries of the area and about the amounts of material to be applied. In the path planning, an optimization criterion is taken into account, which results in a path being created in which as far as possible the same amount of material (seed, fertilizer, chemicals, etc.) is removed from all of the containers of the machine. In other words, the path to be traversed by the machine is designed so that in certain portions of the path more material is removed from a certain container than from one or more of the other containers, but this difference is again compensated over other parts of the path. The path plan can, ultimately, be executed by the machine.

In this way the path on the field that can be covered with the machine can be longer than in the prior art, since the path no longer need be limited by the capacity of the container from which the largest amounts of material are to be applied.

The amounts of material to be removed from the individual containers can be calculated for different candidate paths by means of the paths and relevant amount of material per unit area or length provided in the path plan for the individual containers, and in the end an optimum candidate path can be selected. Here, too, if an application unit is associated with a plurality of containers between which a switching takes place, the calculation takes place for each container.

For the case where the capacity of the containers is insufficient to supply the entire agricultural area with material without refilling, a step of computing an optimum refilling point and/or an optimum refilling time can be carried out. This point can, for example, lie at the edge of a field that is easy to reach with a refill vehicle. The refilling time can be set at a time that is good for the operator, for example at the beginning or end of a mid-day break.

Figure 1:
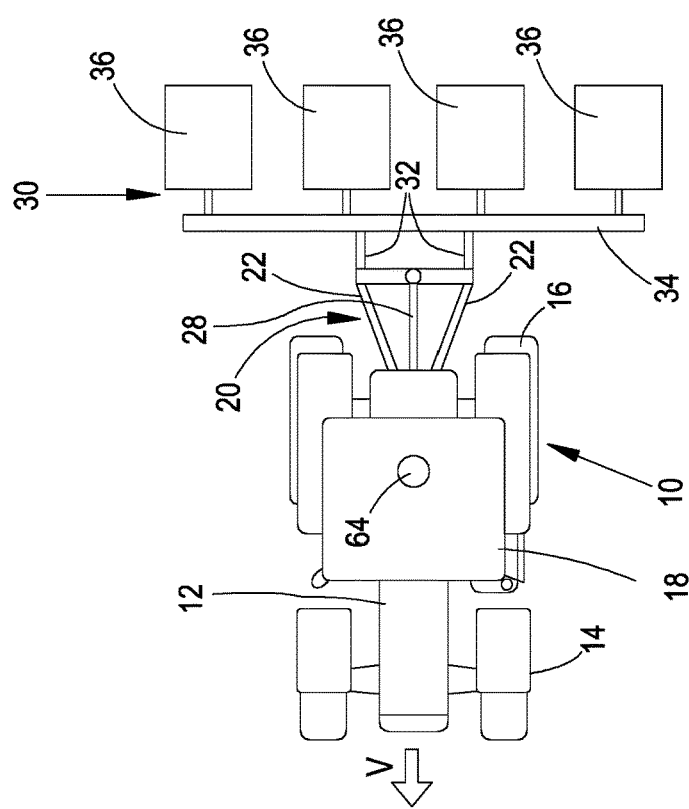
FIG. 1 shows a top view of a machine for application of agricultural material, which is pulled by a tractor.

In FIG. 1 a towing vehicle 10 is shown in the form of a tractor, which is built on a chassis 12 and supported on the soil by front steerable wheels 14 and rear drive wheels 16. An operator position is situated in a cab 18. At the rear of the towing vehicle 12 is a three-point hitch 20, which is composed of two lower link arms 22 arranged side by side and an upper link arm 28 mounted above them.

A machine 30 for application of agricultural material, which is a seeding machine, comprises a mounting frame 32, which is detachably hitched to the rear ends of the lower link arms 22 and the upper link arm 28. A cross support 34, which extends over the entire width of the machine 30 and on which four row units 36 are attached side by side in this embodiment, is affixed to the mounting frame 32.

One is now referred to FIG. 2. The row units 36 are attached to the cross support 34 via U-shaped brackets 38, which are joined to a console 40, which extends vertically at the rear side of the cross carrier 34 and to which two arms 42, 44 are hinged, one above the other, and are additionally each hinged to a frame 46 of the row unit 36. Together with the console 40 and the frame 46, the arms 42, 44 form an adjustable parallelogram that defines the height of the frame 46 above the soil. A pneumatic actuator 48 engages the console 40 at the top on the one side and on the other side engages a mounting point 50 on the lower link arm 44 and defines the position of the frame 46 and the force with which furrow openers 52, 54, which are supported on frame 46, interact with the soil.

Frame 46 carries, in a substantially known way, a container 56 for material to be applied (here: seed), a seed tube 58, and a metering device 60 (in particular, a pneumatic device operating with a reduced pressure provided by a blower, which is not shown), which one by one deposits individual kernels of the seed from the container 56 into the seed tube 58, which deposits the seed in a furrow, which is produced by the furrow opener 54, the operating depth of which is set by a gauge wheel 60. The furrow is closed by a closing wheel 70. An additional furrow can be produced by the furrow opener 52, the working depth of which is set by a gauge wheel 62. This additional furrow can serve for application of fertilizers through an additional tube, not shown, and likewise can be closed by the closing wheel 70. Concerning additional details of the row units 36, one is referred to the disclosure of European Patent Application No. EP 2 517 545 A1, the disclosure of which is incorporated into these documents by reference. The machine 36 could also be supported on wheels and be pulled behind the tractor 10 on a tow bar, instead of being attached to the three-point hitch 20, as is shown. The machine 36 is an example of a machine for application of agricultural material and in another embodiment could also set out young plants or seedlings or apply fertilizers or other chemicals.

An antenna of a positioning system 64 is mounted on the roof of the cab 18 and receives signals from satellites, for example of GPS, Galileo, and/or Glonass systems, to determine its position. The position data are sent by the positioning system 64 to a control unit 66, which in turn is connected to actuators 68 of the row units 36, which can be activated by the control unit 66, each to deposit a seed kernel into the soil. The positioning system 64 could alternatively be mounted on the seeding machine 36, and the control unit 66 on board the towing vehicle 10.

Calculation of the Target Fill State of the Containers

The containers 56 are expediently to be filled with exactly the amount of material in that a specific work assignment can be processed, but then only still contain as little material as possible. Here one must take into account the fact that in certain cases, as described below, more material must be removed from one specific container 56 than from one or more other containers 56.

For this reason a device and a method for determining the target fill state of the containers 56 of the row units 36 of the machine 30 are described. Moreover, a method is described for calculating a target path of machine 30, which is optimized to the extent that a uniform fill state of all of the material containers 36 present on the machine (production means) is achieved. A volume occupied by the material, a weight, or even a production means-specific characteristic such as the number of seed kernels, is understood as the fill state in this case.

The containers 56 of the machine can be filled separately (individually) and contain preferably a volumetric fill state indicator, for example designed as a side marking 72 inside the seed container. The containers 56 can optionally be designed to be toollessly removable, in order to empty out remaining seed, and/or have a bottom opening, in order to empty out remaining seed. The seed container can optionally contain a device for measurement of the current fill state, which can be designed as a weight sensor or sensor registering the fill state.

The machine 30 can be designed so that it adjusts the application amount of seed on curves so that a uniform plant population is achieved. This can take place in the case of mechanically driven seeding units by each metering device 60 being driven individually or a partial number of the metering devices 60 being driven together mechanically, for example via a wheel that runs over the soil. In the case of electrically driven metering devices 60, this takes place by the metering devices 60 being regulated individually with the help of, for example, the rate of rotation of the machine 30 about the vertical axis, so that the application amount is matched to the actual forward speed. Thus, the spacing of successive seed deposit points remains constant even on curves.

Moreover, the machine is preferably outfitted with partial width or single row switching, which enables metering devices 60 to be switched on or off individually in order to prevent overlapping at headlands or in the field (see German Patent Application No. DE 42 23 585 A1).

The control unit 66 is outfitted with a processor and a memory for calculation of the target fill state of the seed container and/or the target path of the working machine, although this calculation could also be carried out by means of a separate computer, which could be a portable device or a stationary computer, for example a farm computer. The georeferenced field boundaries and the provided path plan resulting from them per a substantially known path planning operation are stored in the control unit memory, along with pertinent target populations (number of plants per [unit]

area). Parameters of the machine (for example number of row units 36, row spacing between the individual row units 36, total working width of the machine 30), which are needed for creation of the path plan, are also stored there. The control unit 66 is additionally provided with a display device for display of the target fill state and/or the proposed target path, and with an operator unit, which can be designed as a touch-sensitive surface of the display device, by means of which the operator can enter field boundaries, field zones, target populations, or the desired path plan. The control unit can additionally be outfitted with an indicator display, which reports when the target filling amount of the container 56 has been reached when the container is being filled. The display can also be designed as status lights on the row units or as a display on a stand-alone display (for example, a smartphone).

Figure 3:
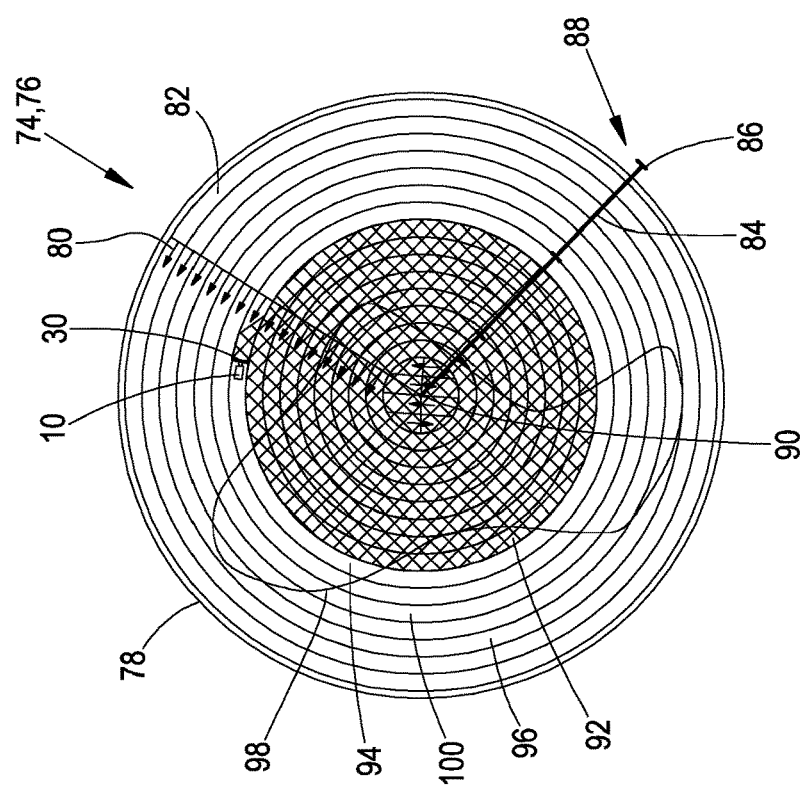
FIG. 3 shows a top view of a field with a first path plan for the machine.

FIG. 3 schematically shows a round field 74 as an example of an agricultural area 76 on which material is to be applied, with typical, nonoptimized paths of the machine 30 pulled by a towing vehicle 10. Such a field geometry is typical for fields 74 with center-pivot irrigation and is employed here as an example in order to present the invention. The features of the invention presented here can, however, be meaningfully extended to other field geometries.

The agricultural area 76 comprises a circular field boundary 78, within which lie (virtual) circular paths 82, each of which corresponds to a working width of the machine 30 and which are traversed in the directions shown by arrows 80. The area 76 is irrigated by a center-pivot irrigation system 88, which has a carrier 84 with spray nozzles, which can be rotated by a drive 86 about a central pivot 90, where a pump for water supply is situated. The area 76 was, according to FIG. 3, already provided with material (seed) in the central region 92 by the machine 30, while an unworked region 100 lies in the radially outward region 96 of area 76 in FIG. 3. Area 76 has a first field zone 94 and a second field zone 96, which are separated from each other by an irregular boundary 98. The field zones 94 and 96 can, for example, differ from each other by different soil types or soil moistures. The field zones 94, 96 can be sown with different seed densities.

The predefined path of the machine 30 is taken as a base for calculation of the target fill state of the containers 56. In this case one distinguishes between path segments on which seed is applied and path segments in which turning maneuvers are carried out or the machine 30 is moved over the field without sowing, which are necessary to reach the center of the field and the parallel path segments provided there. The provided paths are divided into paths $s_i$ for each row unit 36 i, taking into account the number of row units 36 of the machine 30 and their lateral spacing from each other (row spacing). The paths are moreover divided into m segments. The division into segments advantageously takes place for each individual path separately with consideration of the field zones 94, 96 and the resulting area densities for the seed to be applied. The number of segments and the computation expense are thus kept minimal.

The working width $b_i$ occupied by a single row unit 36 i corresponds to the row spacing of the machine 30. The area $A_{i,m}$ worked by the row unit 36 in a segment m with the path length $s_{i,m}$ gives $$A_{i,m} = s_{i,m} \cdot b_i.$$

The target population $n_{i,m}$ for the area $A_{i,m}$ is entered by the operator via the control unit or is established as target population for a georeferenced field zone 94, 96 and stored in the memory of the control unit 66. The number of seed kernels N, for a path $s_i$ is determined by the sum of all path segments m, where the working area $A_{i,m}$ and the target population $n_{i,m}$ of each path segment are calculated together:

$$N_i = \sum_{m=1}^{x} N_{i,m} = \sum_{m=1}^{x} A_{i,m} \cdot n_{i,m}$$

Typical target populations, for example when planting corn, are between 75,000 and 105,000 seed kernels per hectare of area. If the weight or volume rather than the number of seed kernels is used as the fill state specification, it is converted to the corresponding fill state data by means of known or calibrated parameters such as the thousand kernel weight (weight of 1000 seeds) and the bulk weight.

The amount of seed required for working the field and calculated by the method (or the computed target fill state) can now be used for filling the seed containers. Advantageously, feedback is sent to the operator when the target fill state is reached. This can take place via a visual display, for example a status lamp on container 56 or an indication on a smartphone or tablet. An acoustic display by a signalization from the towing vehicle 10 or a vibration alarm from a smartphone is also possible. Feedback about the current fill state can take place via a fill state sensor unit 102 of the container 56.

If the entire field cannot be worked with the container capacity available on the seeding machine, the control device undertakes the calculation so that the refilling of the seed containers is reasonably selected in time or place. For this the operator can set additional boundary conditions (for example a preferred place at the headland, where the seed sacks or a refill vehicle is located, or a time that corresponds, for example, with the midday break), which are taken into account by the software. In a case in which small fields are intended to be sown with the same seed, it is also possible to combine a plurality of fields with defined paths into an overall path.

During the seeding operation the control device monitors the actually applied amount of seed, for example via a substantially known, reflective seed sensor, and compares this amount with the target amount calculated for the total path up to this point. Larger deviations are shown to the operator via the display. If there is a systematic discrepancy between the calculated and actual application amount, for example because the operator has traversed the field paths in a different sequence or direction, a recalculation of the paths can be initiated.

Optimization of the Path Plan

Now a method is described for calculation of a path plan for the machine 10, which is optimized to the extent that (as far as possible) a uniform target fill state with material to be applied for all of the containers 56 present on the machine 30 is achieved. For example, the round field in FIG. 3 is worked in the counterclockwise direction. Assuming that the field has an area of 30 ha and is worked with a (seeding) machine 30 having 24 rows and 18.24 m working width, the difference in the applied amount of seed between the innermost and outermost row units 36 on a circular path is between 47% (innermost circular path) and 6% (outermost circular path).

Figure 4:
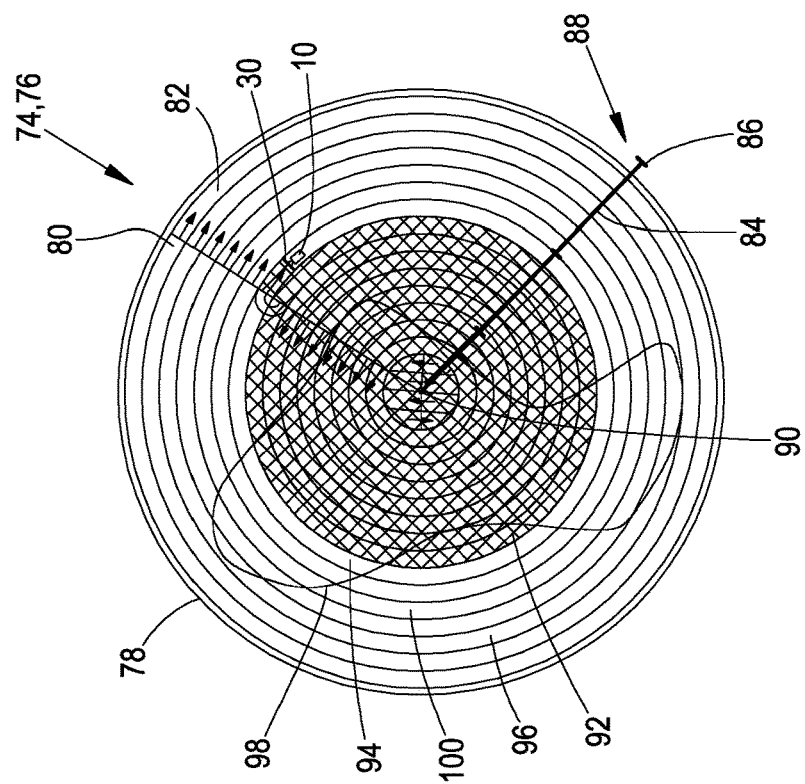
FIG. 4 shows a top view of the field with a second, optimized path plan for the machine.

FIG. 4 now shows the same field with an optimized path planning. By a change of the direction of travel at an appropriate time, the total amount of applied material can be balanced among the containers 56. Process related boundary conditions are stored in the memory of the control unit 66 and are employed in the path calculation. For example, the working direction is first switched after the end of a circular path 82, so that a simple working is ensured further on. The calculation of the path can be undertaken before the start of the seeding operation (and then the target fill states of the containers 56 can be calculated by means of the planned target path) or can be carried out before the work operation or during the work operation on the basis of currently measured fill states in the containers 56.

The creation of the path plan in FIG. 4 can likewise take place by means of substantially known procedures, for example by calculating different path candidates (analogous to European Patent Application No. EP 1 522 823 A1 or Oksanen, Timo, "PATH PLANNING ALGORITHMS FOR AGRICULTURAL FIELD MACHINES" Dissertation, Helsinki University of Technology (December 2007)) and ultimately an optimized path plan is chosen from them by means of the criterion of uniform withdrawal of seed from all containers 56.

If the target path is calculated for a plurality of fields, the working sequence of the fields, the transport routes and a refill point at a distance from the fields are taken into account in the calculation of the target arrows.

Having described one or more embodiments, it will become apparent that various modifications can be made without departing from the scope of the invention as defined in the accompanying claims. Further embodiments of the invention may include any combination of features from one or more dependent claims, and such features may be incorporated, collectively or separately, into any independent claim.

The invention claimed is:

1. A method for calculating optimized filling amounts for containers disposed side by side on a machine, each with an application unit for application of an agricultural material, the method comprising the following steps:
   providing a data processor;
   creating, with the data processor, an intended path plan for each container of the machine for application of the agricultural material to an agricultural area;
   calculating, with the data processor, an amount of the agricultural material to be applied by each application unit per unit area of the intended path;
   determining an amount of the agricultural material to be applied along the intended path for each container that are provided in the intended path plan for the individual containers; and
   generating a total filling amount for each container to be filled as needed to carry out the intended path plan.

2. The method of claim 1 further comprising the steps of:
   measuring an actual filling amount in each container by a fill state sensor;
   comparing the actual filling amount with the total filling amount for each container; and
   outputting a signal value dependent on the result of the comparison.

3. A method for creation of an optimized path plan for a machine for application an agricultural material, which comprises containers arranged side by side, each provided with an application unit for the agricultural material, the method comprising the steps of:
   providing a data processor;
   receiving data, with the data processor, concerning an agricultural area on which the agricultural material is to be applied;
   calculating, with the data processor, a constant or site-specific variable amount of the agricultural material to be applied per unit area to the agricultural area; and
   generating an optimized path plan for the machine for application of the agricultural material to the agricultural area that is optimized in terms of a balancing of an amount of the agricultural material to be removed from each of the containers.

4. The method of claim 3, wherein the step of generating the optimized path plan for the machine comprises:
   determining the amounts of the agricultural material to be removed from each container using the path plan specific to each container and the constant or site-specific variable amount of the agricultural material per unit area for one or more path plans; and
   selecting an optimum path plan.

5. The method of claim 4 further comprising the step of:
   calculating at least one of an optimum refill point or an optimum refill time to refill the containers to supply the agricultural area with the agricultural material.

6. A control system for creation of an optimized path plan for a machine for application of an agricultural material to an agricultural area, the system comprising:
   a plurality of side by side containers, each container associated with an application unit for applying the agricultural material;
   a fill level sensor associated with each container, the fill level sensor generating a signal indicative of a fill level of the container;
   an application unit rate sensor associated with each application unit, the rate sensor generating a signal indicative of the rate at which the agricultural material is being applied by the application unit; and
   a control unit receiving the signals from the fill level sensor and the rate sensor and determining a path plan for the machine, wherein the control unit compares the fill levels and application rates for the plurality of containers to the path plan and recalculates the path plan to provide an optimum path plan.

7. The system of claim 6 wherein the control unit receives data concerning an agricultural area on which the agricultural material is to be applied and calculates the amount of agricultural material to be applied per unit area to the agricultural area.

8. The system of claim 7 wherein the control unit recalculates an optimized path plan for the machine for application of the agricultural material to the agricultural area that is optimized in terms of a balancing of the amounts of agricultural material removed from each of the containers and the optimum refill location and refill time.

9. The system of claim 6 further comprising a display unit which visually indicates to an operator when a target fill amount of the container is achieved for the optimum path plan.

10. The system of claim 9 wherein the display visually indicates the optimum path plan within the agricultural area.

* * * * *